…

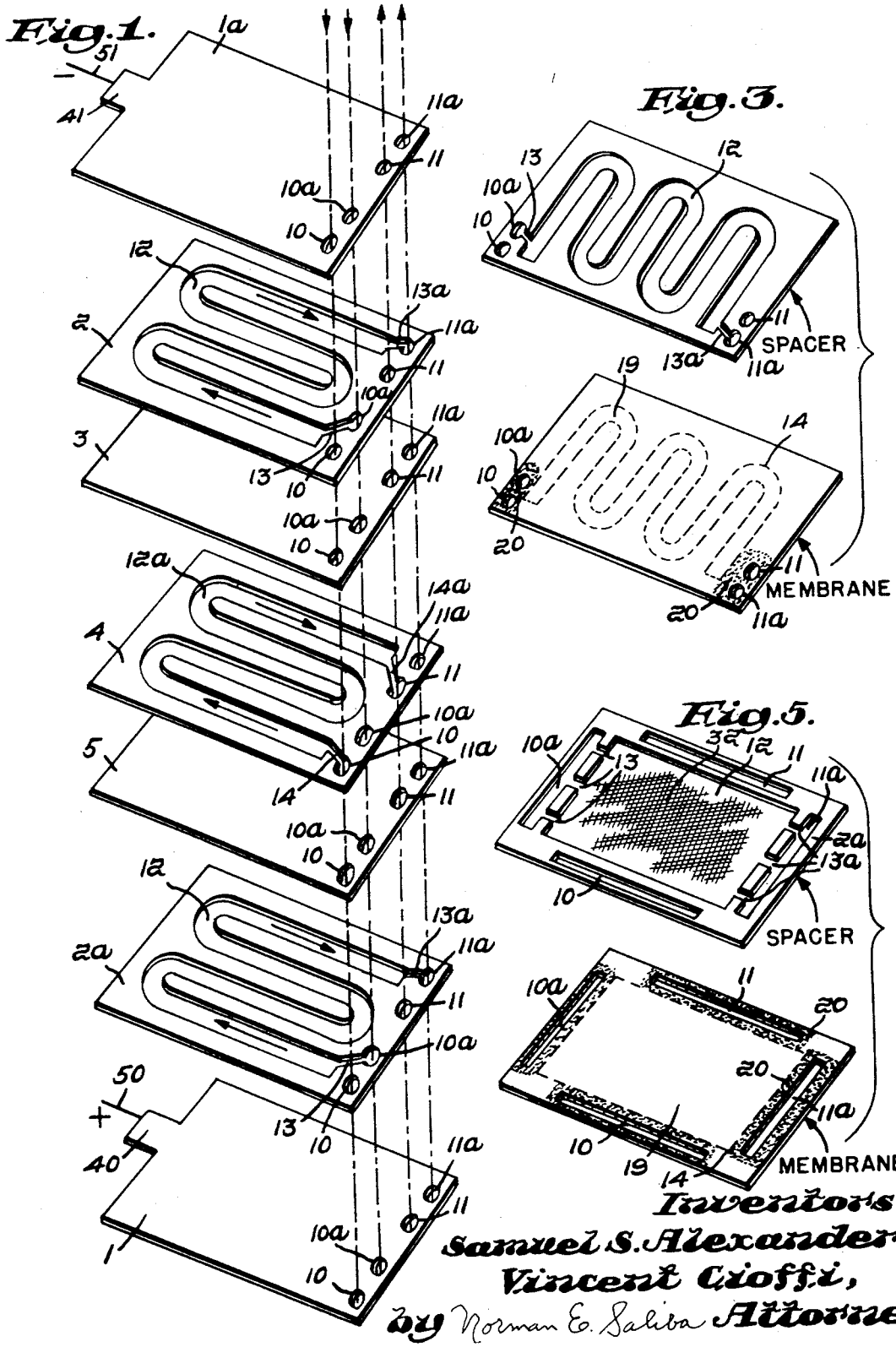

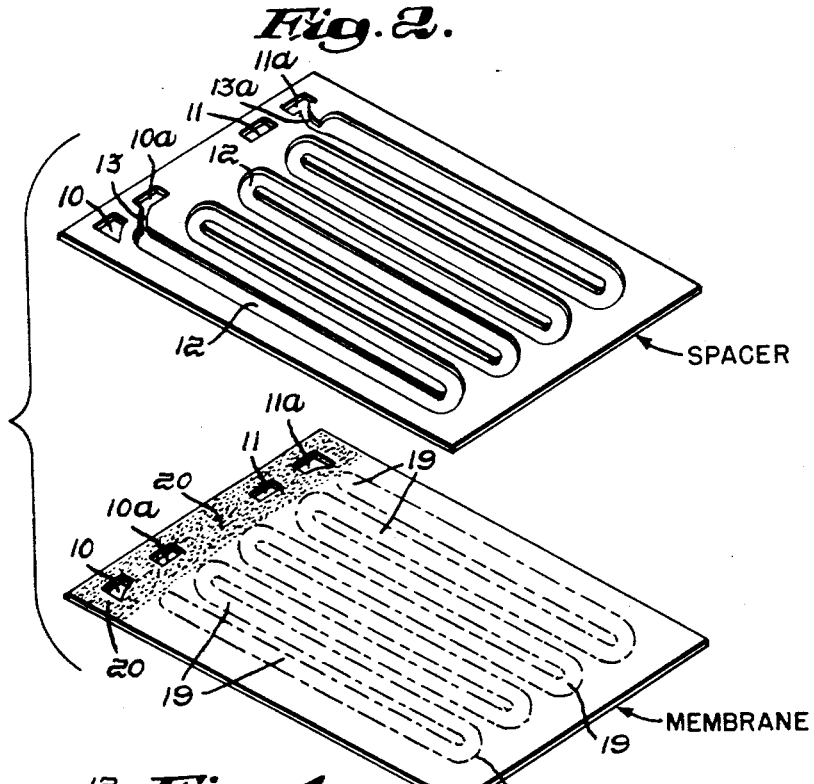
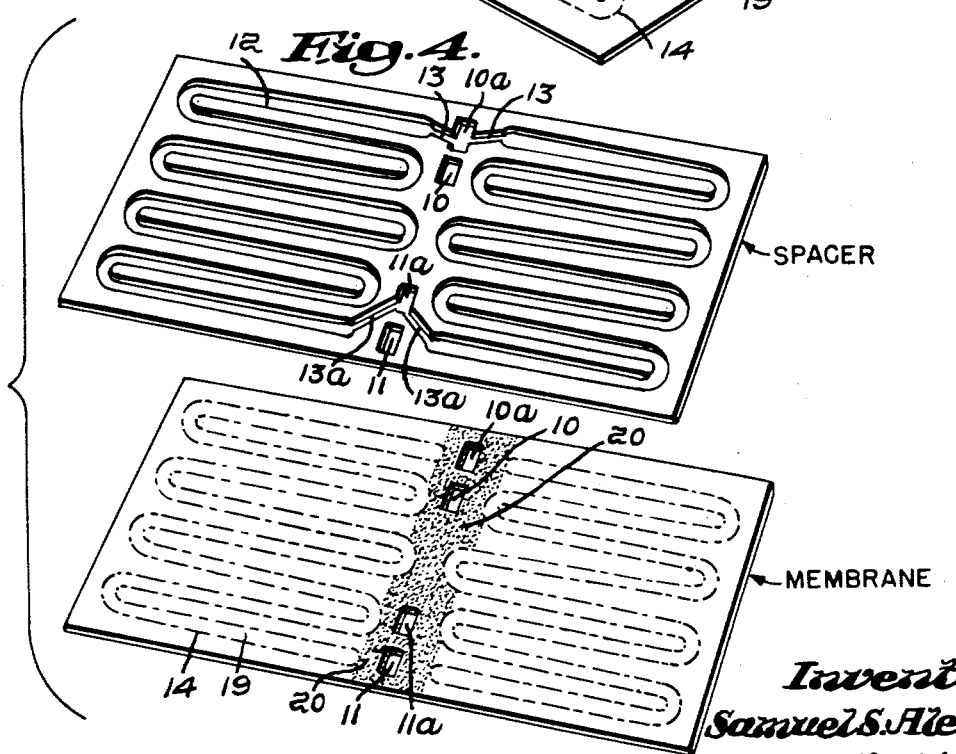

3,412,006
ION-EXCHANGE MEMBRANES
Samuel S. Alexander, Boxboro, and Vincent Cioffi, Braintree, Mass., assignors to Ionics, Incorporated, Cambridge, Mass.
Filed Jan. 11, 1965, Ser. No. 424,770
12 Claims. (Cl. 204—296)

ABSTRACT OF THE DISCLOSURE

This invention is directed to ion-exchange membranes for use in electrodialysis apparatus whereby certain areas of the membranes, especially the area around the manifold holes, are chemically treated by impregnating the area with a liquid monomer which is polymerized therein to form a cross-linked, substantially non-ionic polymer for the purpose of obtaining an area having increased stiffness and increased electrical resistance as compared to the untreated remaining area of the membrane.

---

This invention relates to electrodialysis apparatus employing novel ion-exchange membranes and in particular to a method of treating membranes to improve their useability in electrodialysis apparatus. Specifically the invention concerns a process of polymerizing monomers within selective areas of an ion-exchange membrane to impart the qualities of increased stiffness and high electrical resistance to said areas.

Electrodialysis is a well known process for the removal of electrolytes from brackish waters and from various industrial solutions. An electrodialysis unit generally comprises a plurality of diluting chambers alternately disposed between a plurality of salt concentrating chambers and, in addition, at least two terminal electrode chambers containing a cathode and anode respectively for passage of a direct current transversely through the unit. The diluting and concentrating chambers which are comprised of spacer members are disposed between the terminal electrodes and separated from each other by alternately placed selectively anion permeable and selectively cation permeable membranes. In operation, the dissolved ionized salts of a liquid are transferred through the appropriate membranes from the deionizing (diluting) chambers into the salt concentrating chambers by means of a direct current applied across the membranes and chambers. In this manner the ionized salts collect in the concentrating chambers and are continuously carried away through discharge outlets. The solution in the diluting chambers is collected from discharge outlets as a substantially salt-free liquid. The combination of a diluting and concentrating chamber constitutes a cell pair. A large number of cell pairs may be stacked between a pair of electrodes to produce a multi-cell electrodialysis unit. Such systems showing the arrangement of membranes, spacer members and electrolyte streams and the method of operation to effect demineralization are more fully described in U.S. Patents Nos. 2,708,658, 2,826,544, 2,891,899 and many others. The manufacture and properties of ion-selective membranes are fully disclosed in U.S. Patents Nos. 2,730,768, 2,860,097, Re. 24,865 and others.

As shown in FIGURE 1, the electrodialysis systems to which the novel membranes of this invention can be employed may comprise at least one cation-exchange membrane 3 and anion-exchange membrane 5 confined between a pair of electrodes 1 and 1a. The electrodes 1 and 1a are connected to a source of direct current (not shown) through leads 50 and 51, respectively. The leads make contact with the electrodes by any convenient connecting means such as electrode tabs 40 and 41. When a direct current voltage is impressed upon the electrodes, one of them becomes a cathode and the other an anode. For purposes of illustration, electrode 1 is the anode and 1a is the cathode. Membranes 3 and 5 are preferably present as a plurality of alternating anion- and cation-exchange membranes, each separated from one another by spacer members such as 2 and 4. Spacer members may also separate the end membranes from the respective electrodes adjacent thereto.

As will be seen from the drawings, both the membranes and the spacers are provided with at least one and preferably two or more manifold inlet holes and outlet holes for the passage of liquids therethrough. The electrodes may also be provided with manifold inlet holes and outlet holes. For purposes of illustration, the electrodes, spacer members and membranes are shown to have a pair of manifold inlet holes 10 and 10a and a pair of manifold outlet holes 11 and 11a. As shown in FIGURE 1, the manifold holes are oval and are all located on the same side of the membranes, spacers and electrodes. However, it is to be understood that a wide variety in the size, shape, number and location of the manifold holes may be employed. The electrodes, spacers and membranes are so constructed and arranged that the inlet and outlet holes of the respective elements are aligned with one another, whereby the influent solution may pass through manifold inlet holes 10 and 10a through the various spacers and membranes and out manifold holes 11 and 11a of the respective members to a common effluent pipe or receptacle (not shown). Each spacer member of an electrodialysis stack is provided with a similarly designed flow path area connecting from one of the inlet (influent) holes to one of the outlet (effluent) holes whereby the electrolyte is caused to flow along and in contact with the adjacent ion-exchange membranes or electrodes. As shown in FIGURE 1, spacer members 2 and 2a are provided with a tortuous flow path 12, each being similarly connected to inlet hole 10a and outlet hole 11a by connecting channels 13 and 13a respectively. Spacer member 4 is also shown provided with a tortuous flow path 12a connected to inlet hole 10 and outlet hole 11 by connecting channels 14 and 14a, respectively. Generally the connecting channels are narrow slits, notches or cuts in the spacer material that function to connect the flow path area of each spacer with the appropriate inlet and outlet manifold hole. For purposes of this disclosure the channel cuts are not to be considered part of the spacer's liquid flow path area. Thus, liquid entering through manifold inlet hole 10a of electrode 1a is directed by connecting channel 13 through flow path 12 of spacers 2 and 2a thereby flowing tortuously along and in contact with the adjacent electrodes and ion-exchange membranes. Liquid entering through manifold inlet hole 10 of electrode 1a passes directly through manifold inlet hole 10 of spacer member 2 (as it cannot enter flow path 12) and enters the flow path 12a of spacer member 4 via channel 14, thereby flowing tortuously along and in contact with adjacent ion-exchange membranes 3 and 5. In a system utilizing a plurality of alternating anion- and cation-exchange membranes, alternating spacer members 2 and 4 are provided, thereby causing liquid entering inlet holes 10 or 10a to flow through alternating spacer members.

In operation, a direct current is impressed across the electrodes and an electrolyte solution, for example, an aqueous salt solution, is fed into influent manifold holes 10 and 10a of top electrode 1a, from which it flows by gravity or pressure means down through the manifold holes of various membranes and spacers toward the bottom electrode. The solution of course may, in the alternate, be fed by pressure means into influent manifold holes 10 and 10a of the bottom electrode up through the various manifold holes toward the top electrode. As the electrolyte solution flows through the manifold holes a portion thereof passes from influent hole 10a into the alternating spacer members such as 2 and 2a, wherein it is caused to flow tortuously along and in contact with the adjacent ion-exchange membranes or electrode to effluent holes 11a. Similarly a portion of the solution fed into manifold hole 10 passes into each of the alternating spacer members 4 wherein it is caused to flow tortuously along and in contact with the adjacent ion-exchange membranes to effluent hole 11.

In a manner well known in the art, the electric current passes from one electrode to the other via the various membranes and electrolyte solution contained in the spacers' flow areas. Thus, on flowing solution through the various spacers, the cations and anions of the solution will be selectively carried toward the cathode and anode respectively through the appropriate ion-selective membranes, thereby demineralizing the solution, at least in part, and permitting recovery of the demineralized solution from a manifold outlet hole. While, for purposes of simplicity, a single flow path has been illustrated in the spacer members, it will be appreciated that a plurality of such flow paths in side-by-side relationship may be channeled from a common inlet hole to a common outlet hole. A plurality of such flow paths are generally employed to obtain a greater output from the system. Also, it is not necessary that all the manifold holes be located on one side of the spacer or that the flow path be of a tortuous design. As is well known in the art, various flow path configurations and manifold hole locations may be employed in spacers which are to be used in electrodialysis processes. Some of these variations are shown in FIGURES 2 to 5. Of course it is apparent that wherever the manifold holes of the spacers are located, the holes of the other elements of the electrodialysis stack must be similarly located so as to be aligned with one another.

The foregoing description applies to the structures and operation of electrodialysis systems heretofore known in the art, as previously mentioned. Such a system therefore does not per se disclose the inventive subject matter of this application, but is described in order to make the present invention more clearly understood.

In the operation of electrodialysis systems such as described above, various drawbacks have been noted. For example when a direct current voltage is applied across the terminal electrodes, the current ideally flows perpendicularly through the face of each conducting ion-exchange membrane and through the cut out portion of each spacer via the flowing conductive electrolytic solution contained within the flow path areas of said spacers. The heat generated by the flow of current therethrough is dissipated by the cooling effect of the flowing electrolyte, as will be appreciated by those skilled in the art. While the current will ideally flow transversely through the membranes and liquid flow areas in the manner described above, it has been found that there is a tendency for the current in part to flow in a generally lateral direction from one electrode, through certain gasketed membrane areas toward the manifold holes containing flowing electrolyte, thence through the conduit formed by the manifold holes and then laterally again from the manifold holes through the membranes to the other electrode. This lateral shorting transgresses the membrane's normally non-conducting gasketing area which separates each membrane's flow path area from its manifold holes. The lateral current flow is most pronounced in the membranes nearest to the respective electrodes and tends to diminish toward the center of the electrodialysis stack, that is, the lateral flow is less pronounced in the membranes located furthermost from the electrodes. The lateral shorting in those membranes so affected causes overheating in the substantially dry gasketed membrane areas nearest to the manifold holes, and in turn causes "burning" or heat damage in those areas, thereby interfering with and ultimately incapacitating the system. This burning of spacers and membranes in this shorting area is caused by the lateral voltage gradient which develops between the conductive solution flowing in the manifold holes and the solution flowing in the spacer's flow path adjacent thereto. As there is no cooling electrolyte solution to dissipate the heat in the gasketed areas located between the flow path and the adjacent manifold hole, an overheating occurs in this area. This tendency to lateral shorting increases as the conductivity of the manifold solution and the total applied voltage per cell pair increases. Since the spacers must function to gasket certain areas of their adjacent membranes they are generally made of pliable plastic materials which are susceptible to damage by heat. Such overheating ultimately causes a melting of the plastic material and membranes. Extrusion of the softened plastic into the manifold holes ultimately results in blockage of the flow of electrolyte. Upon terminating the source of current, the resulting cooling in turn causes a fusing of the spacers to the next adjacent membranes, thereby preventing any separation of the component parts without further damage. It will therefore be appreciated that continuous usage of the system is critically hampered by the lateral shorting.

Generally, prior attempts to obviate the problem of heat damage due to lateral shorting have involved the use of gaskets and grommets made of electrically insulating material. With gaskets, a small section of the membrane is cut out around the membrane's manifold hole to accommodate the gaskets. Attempts to obviate the problem by using grommets involve fitting the grommet over the lip of the membrane at the manifold hole and cutting out from the adjacent spacers a section around the manifold holes to accommodate the grommet flanges. The use of gaskets or grommets does provide a barrier against the flow of current which is reasonably effective. However, they are not commercially feasible since they are difficult to handle and place in position, and have a tendency to deform and interfere with the hydraulics of the stack.

Another prior art method of lessening the tendency for lateral shorting is to provide the electrodes of an electrodialysis stack with certain specific areas which are electrically non-conductive. Electrodes of this nature are fully described in a copending application Ser. No. 289,815 filed June 24, 1963, now U.S. Patent No. 3,291,716. The use of these electrodes in conjunction with the novel membranes of this present invention would be highly effective in reducing or preventing lateral shorting in electrodialysis stacks.

A further problem encountered in the operation of electrodialysis units or stacks is that of membrane bowing. As previously mentioned the usual method of introducing and removing liquids during the desalting operation is by means of conduits formed through the stacks by aligning the manifold holes which are cut generally into the borders of the spacers and membranes. The fluid inlet and outlet manifold holes of each spacer are in turn connected to the flow path area of the appropriate diluting or concentrating chambers by connecting channels which are cut out sections of spacer material forming narrow passageways. The fluids circulating through the diluting and concentrating chambers are hydraulically separated, with both fluids directed and removed from their respective chambers or group of chambers by separate inlet and outlet manifold holes. The spacers' liquid flow path area generally contain straps or other mechanical means for promoting turbulent flow or liquid therethrough. U.S. Patents Nos. 2,708,658, 2,891,899 and others fully disclose types of spacer designs applicable to use in electrodialysis units.

Most commercially employed electrodialysis stacks require ion-exchange membranes that have minimal electrical resistance. Therefore, the membranes employed are relatively thin and flexible and under the application of a small differential pressure have a tendency to bow or deflect. As is well known in the art, the membrane area which is highly susceptible to bowing is encompassed within the connecting channel area of its adjacent spacers. This critical portion of the membrane will often bow or deflect into the adjacent spacers' connecting channel where large pressures are applied to compress the membranes and gasketing spacers into a liquid tight stack. Bowing may also occur where the liquids on both sides of the membranes are circulated under different hydraulic pressures, the result being a leakage of solution from one chamber to the adjacent chamber by way of the membranes' bowed connecting channel area. In the past, attempts to overcome this difficulty have been made by fitting into the connecting channels of each spacer a foraminous insert or a supportive bridge such as described in U.S. Patents Nos. 2,881,124 and 2,894,894. However, in practice, these mechanical supports are troublesome to insert and service since it is necessary that they be joined to each spacer or to each membrane by gluing or welding, otherwise there is danger of slipping during stack assembly or operation. Furthermore, employing inserts that substantially fill the connecting channel area can restrict liquid flow at this point and cause excessive pressure drop. Suspended foreign matter carried with the liquid to be treated may be trapped by the inserts and eventually cause complete blockage of a chamber. As will hereinafter be described, the process of this invention will among other things enable the practitioner to treat the connecting channel area of an ion-exchange membrane to increase its stiffness and thus lessen its tendency to flex or bow.

Therefore, it is an object of this invention to provide novel ion-exchange membranes for use in electrodialysis apparatus wherein selected membrane areas are chemically treated and so spaced and arranged so as to reduce the tendency for lateral current shorting and membrane bowing without the need of employing mechanical devices.

Another object is to chemically treat ion-exchange membranes for use in electrodialysis apparatus wherein the problem of heat damage to membranes and spacers is obviated or at least reduced.

Still another object is to chemically treat ion-exchange membranes to provide said treated area with decreased electrical conductance and a simultaneous increase in physical stiffness.

Various other objects and advantages will appear from the following description of the invention and the novel features will be particularly pointed out hereinafter in connection with the appended claims.

For a fuller understanding of the invention, reference should be made to the following detailed disclosure taken in conjuction with the drawings.

FIGURE 1, which has previously been described, is a perspective view of a conventional electrodialysis system showing the arrangement of the structural elements in exploded relationship with one another.

FIGURES 2 to 5 show perspective views of various modifications of the novel membranes of this invention in exploded relationship with an adjacent spacer; each membrane modification being determined by the particular design of the spacer employed in the electrodialysis stack.

The membrane area which is to be selectively treated by the method of the present invention will best be understood by reference to FIGURES 2 to 5. In FIGURE 2, there is shown a detailed illustration of a membrane and one of its adjacent spacers. The spacer is shown as a sheetlike member having a continuous cut out portion therein to form a tortuous liquid path area 12. The flow path is channeled from inlet hole 10a to outlet hole 11a by means of connecting channels 13 and 13a, respectively. Another spacer (which is not shown) would be placed adjacent to the other side of the membrane so that on assembly the membrane would be sandwiched and gasketed between two spacers. This other spacer would have its flow path channeled from inlet hole 10 to outlet hole 11 by means of its own separate connecting channels. The dash-dotted lines 14 define the area of the membrane that corresponds to the flow path area 12 of the adjacent spacer. In operation, the membrane area 19 encompassed within line 14 would be in contact with electrolyte solution flowing through tortuous path 12 of the spacer. The area of the membrane which is to be treated by the process of this invention (which process will hereinafter be described in detail) is designated in the drawings by reference numeral 20 and is shown as stippled portions whereas the unstippled areas are left intact. The areas of the membrane to be selectively treated should comprise in general the area surrounding the manifold holes and in particular should extend from each manifold hole towards the membrane flow path area. Additionally, in order to reduce flexing or bowing of the membrane area encompassed by the connecting channels 13 and 13a of the adjacent spacer, it is necessary that this defined membrane area be also treated. The treated area of the membrane should, as a general rule, extend outwardly in all directions from the inside edge of each manifold hole for a distance of at least about ¼″. Increased ohmic resistance of the inside edge of the holes will materially assist in the prevention of current leakage from the liquid flow path into the manifold hole. Any current flowing in the manifold holes will not contribute to the desalting process and will result in a net loss of current efficiency. The membrane area lying between the manifold holes and the edge of the membrane's flow path area, which edge is situated opposite to and in proximity to said holes, is particularly sensitive to lateral shorting. Therefore, it is preferable that an additional area be treated which extends from the manifold hole in a direction towards the membrane's flow path area for a distance sufficient to diminish or prevent lateral shorting. Good results have been achieved with treated areas extending about ¼″ from the hole toward the flow path area. Although areas of less than ¼″ have been shown to lessen the degree of lateral shorting, it has been found that in general the larger the area treated by the process of this invention the more effective are the results. Accordingly, while it is within the scope of this invention to inactivate areas substantially less than ¼″, it is preferable that the entire membrane area commencing from the inner edge of the manifold hole and extending to the oppositely disposed edge of the membrane's flow path be subjected to treatment as will hereinafter be described. Likewise it is within the scope of the invention to utilize treated areas that further extend into the flow path area proper. However, such an overextension should be avoided whenever possible since the portion lying in the flow area would not be sufficiently conductive to contribute towards ionic or salt transfer during the electrodialysis process. It will be apparent to those skilled in this art that the treated membrane areas should not be greater than necessary to accomplish the results of preventing or reducing lateral shorting and membrane bowing. It should be understood that the membrane area treated and the method of treatment employed to accomplish the objects of the invention will vary in accordance with the conductivity of the solution in the manifold holes, the total applied voltage per cell pair, the particular design of the spacer flow and connecting channel area, the pressure difference across the membranes and other factors. In other words, depending on the operating conditions of the electrodialysis stack, the treated membrane areas may be of a size and shape necessary to provide the degree of protection sought by the practitioner. Generally good results in regard to lateral shorting have been obtained with both faces of the membrane containing treated areas covering the inside edge of the manifold holes and extending from ¼″ to 2″ towards the membrane flow path area. As for reducing the bowing tendency of that portion of the membrane which is defined by the adjacent spacer's connecting channel, it is preferable that this total defined area be subjected to the stiffening treatment. It will be noted in FIGURE 2 that the treated area 20 of the membrane is continuous and covers the entire width of one edge of the spacer. This stippled area 20 surrounds the entire inside and outside edge of the manifold holes and, in addition, extends up to the edge of the membrane's flow path area which is opposite to and in proximity to said manifold holes. In such an arrangement, the portions of the membrane which require the increased stiffness would also have been included in the treated area.

In FIGURE 3 there is shown a variation of a tortuous path spacer wherein the inlet manifold holes 10 and 10a are located on one side of the spacer and the outlet manifold holes 11 and 11a are placed on the opposite side of the spacer. The general area of the membrane which is to be treated is adjacent to the manifold holes as shown by stippled areas 20 and preferably covers an area extending to the edge of the flow path area; said flow path area being opposite from and generally contiguous to the holes.

FIGURE 4 shows a larger type tortuous spacer wherein the manifold holes are located in the central section of the spacer. In this arrangement the holes 10a and 11a each have respectively two channel cuts 13 and 13a connecting with the two flow path areas adjacent thereto. The high resistant and stiffened areas of the membrane are shown by stippled areas 20.

FIGURE 5 is another variation of the invention. The spacer has four long rectangular manifold holes 10, 10a, 11 and 11a around the edges. Inlet manifold hole 10a is connected to the generally rectangular shaped spacer flow path area 12 by a plurality of connecting channels 13. On the opposite side of the spacer is located effluent manifold hole 11a which is similarly connected to the flow path area by a plurality of channels 13a. In this general type of spacer, plastic screens or expanded material 32 are usually located throughout the spacer's flow area 12 to prevent its adjacent membranes from coming in contact with each other. These screens also function as obstructions to cause the liquid passing through the flow path area to assume a turbulent flow and to be better distributed over the flow area.

The membranes fabricated by the process of this invention will contain selectively treated sections 20 which cover at least a portion of the area between the manifold holes and the edges of the flow path areas opposite thereto. In general the treated area commences from the inside edge of the manifold hole which is in close proximity to the flow path area and extends from said manifold hole in a direction toward the flow area for a distance sufficient to prevent lateral shorting. This distance preferably extends to the edge of the flow path area and not beyond such edge. For added safety against current leakage into the manifold holes it is advantageous that the total inner edge of each hole be so treated; the treated area also extending outwardly around the periphery of each hole for a distance of at least ¼″. Both sides of the membrane, of course, should be treated in substantially identical areas. However, if desired, it is within the scope of the invention to utilize membranes in electrodialysis systems which have been treated on only a single side.

In general, the chemical treatment of an otherwise finished ion-exchange membrane to produce the desired results of increased electrical resistance and decreased flexibility comprises impregnating the desired membrane areas with a monomer or combination of monomers followed by their polymerization within the body of the ion-exchange resin. The monomers, either singly or in combination, must be capable of being dissolved in a solvent present within the membrane otherwise the impregnation or diffusion of the monomer constituent into the resin will not readily occur. Thus an ion-exchange membrane containing a polar solvent such as water will readily allow diffusion therein of water soluble monomers such as for example monomers of formaldehyde and/or resorcinol. Other polar solvents, such as alcohols, dimethylformamide, dimethylsulfoxide and the like may, of course, be utilized as the monomer solvent. The monomers are contacted with the desired membrane area and allowed to infiltrate into the body of the exchange resin. Where more than one monomer is used in the treatment, the membrane area may be soaked separately in each monomer or, in the alternate, be allowed to soak in the monomer mix. The polymerization of the monomers within the membrane should best be carried out in the presence of a catalyst. Various means for accelerating the polymerization reaction are well known in the polymer art, such as the use of acid and alkaline catalysts and, of course, simple heating. The peroxides and Friedel-Crafts catalyst have been found especially appropriate for use with the vinyl monomers. The treatment of the membrane will result in the formation of a cross-linked, substantially non-leachable polymer filler which imparts to the effected membrane area increased electrical resistance with a simultaneous increase in physical stiffness.

The monomers or comonomers which are soluble in polar solvents and adaptable for use in the present invention may be mentioned as those belonging to the following classes: vinyl, phenol-aldehyde, formaldehyde-carbamide, formaldehyde-triazine, formaldehyde-ketone, epoxy, polysulfide, formaldehyde-amino, polyamide and polyesters. Under the class of vinyl monomers may be mentioned styrene, vinyl chloride, vinylidene chloride, polyvinyl pyrrolidone, ethyl acrylate, acrylonitrile, acrylic acid, methyl methacrylate, vinyl pyridine, vinyl acetate, dimethyl fumarate, isobutylene, butadiene and the like. Of the phenol-aldehyde type polymers may be mentioned comonomers of phenol-formaldehyde, phenol-fufural, resorcinol-formaldehyde, hydroxy benzene-formaldehyde, cresylic acid-formaldehyde, cresol-formaldehyde and others. Under the formaldehyde-carbamide class would be listed formaldehyde-urea and formaldehyde-guanidine. An example of a copolymer of the formaldehyde-triazine class would be formaldehyde-melamine. Some specific examples of the remaining classes, as mentioned above, are as follows: the formaldehyde-ketone class would include formaldehyde-acetone, formaldehyde-cyclohexone, etc.; epoxy class includes epichlorohydrin-bisphenol, epichlorohydrin-resorcinol, etc.; polysulfide class includes sodium polysulfide-glycerol dichlorohydrin, sodium polysulfide-dichloroethyl formal, etc.; formaldehyde-amine class includes, among others, formaldehyde-aniline, formaldehyde-p-toluene sulfonamide, formaldehyde-dicyandiamide biuret and formaldehyde-ethylene urea. The class of polyamide monomers would include, for example, sebacic acid-tetramethylene diamine and adipic acid-hexamethylene diamine ϵ-caprolactam. As an illustration of a polyester monomer class may be mentioned terephthalyl chloride-tetramethylene glycol.

The following examples show by way of illustration and not by way of limitation the process of producing the novel membranes of this invention and their use in electrodialysis systems.

EXAMPLE 1

A monomeric liquid mixture comprising about 500 grams of resorcinol (reagent grade) dissolved in about 500 ml. of 37% formaldehyde was poured into a shallow container. (Care should be taken that the monomeric mix is not contaminated with a catalyst since, for example, sufficient acid will catalyze this quantity of mix to result in a highly exothermic bulk polymerization. Also the monomer mix should not be allowed to stand too long before using, due to its tendency to slowly polymerize at room temperature.) Two homogeneous cation-exchange membranes, each comprising a sulfonated copolymer of styrene and divinylbenzene and containing four manifold holes on its one edge (as illustrated by the membrane of FIGURE 2) were selected to be treated. Both membranes had previously been converted, at least in part, to the hydrogen form by soaking in 1 normal HCl for about one hour, after which they were thoroughly rinsed in changes of distilled water to remove the adsorbed or unbound acid. The membranes' border areas containing the four manifold holes were dipped into the monomer mix to a level which not only completely covered the holes but which extended to the edge of the membranes' flow path areas, as illustrated in FIGURE 2 by numeral 20. Preferably the level of the liquid mix should not be so high as to contact areas that would lie within the membranes' flow path area. The liquid level should also be made to cover the membrane area encompassed within the connecting channel areas of the spacers that are to be placed adjacent to the membrane during stack assembly. Dipping the entire border section of these membranes up to the edge of the flow path area automatically included the connecting channel area and also the inside edges of each manifold hole. Both membranes were kept immersed in the mix; one being removed after 5 minutes and the other after 15 minutes. The membranes which are normally a tan color developed a pinkish to reddish discoloration in the contact areas. In general, the more complete the monomer penetration of the membrane the deeper the color development. After removal from the mix the discolored areas were dipped into a one normal HCl solution (40–50° C.) for at least about one minute to further catalyze and complete the polymerization reaction. The membranes were flushed with water and deflection tests and electrical resistance measurements were carried out on the treated and untreated sections. In the deflection tests small sections of membranes are subjected to controlled hydraulic pressures and the distance the membrane deflects or bows is measured in millimeters. In the electrical resistance measurements, membrane test strips are first equilibrated in 1 normal NaCl solution and through resistance and lateral resistance measurements are then taken in 0.01 N NaCl solution. Through resistance is measured by placing platinum probes (probe area=0.123 cm.$^2$)

on opposite faces of the membrane whereas lateral measurements are taken along the length of a membrane test strip (2 cm. wide by 6.2 cm. long). On the membrane section treated for 5 minutes the deflection at 30 p.s.i.g. was about 20% less than for the untreated control section. The through resistance of the treated section had increased by a factor of 8 and the lateral resistance by about 1.2. The membrane section that was treated for 15 minutes gave a deflection measurement reduced by a factor of 2 as compared to the untreated section. The through resistance of the treated section increased by a factor of 10 and the lateral resistance increased by about 1.3.

EXAMPLE 2

A cation exchange membrane of the type previously mentioned was treated in a manner similar to that employed in Example 1 but with the following procedural changes. Prior to treatment with the monomers, the membrane was equilibrated in an equimolar aqueous mixture of sodium chloride and hydrochloric acid so as to decrease the hydrogen ion concentration in the membrane. Also instead of employing a mixture of resorcinol and formaldehyde the membrane border was dipped in the two monomers separately. The border was first immersed for 5 minutes in an aqueous solution 50% resorcinol by weight, washed with water and then immersed for an additional 5 minutes in the 37% formaldehyde solution. Using this improved technique the lateral resistance was increased by a factor of two. Presumably, the use of less acid during the initial equilibration of the membrane prior to treatment with monomers will allow deeper penetration of the monomers into the body of the resin before polymerization occurs. Where a membrane having a high initial concentration of hydrogen ions is contacted with the monomer mix, polymerization will occur rapidly on the surface of the membrane to produce a stiff and highly resistant film on the surface. However, the rapid formation of the condensation type polymer on the membrane face will prevent further diffusion of monomers into the resin body so that the electrical resistance in a lateral direction would be only moderately increased. Also the penetration of monomers into the membrane body is more complete where each monomer is allowed to diffuse into the resin separately rather than as a mixture. Another disadvantage in the use of a monomer mix is that such a mix cannot be kept over any great length of time since there is a tendency for the mixture to slowly polymerize on standing.

EXAMPLE 3

A cation membrane was treated by the general method of Example 2 but in this case the membrane was not contacted with any acid prior to the monomer treatment. Instead the membrane was first equilibrated in an aqueous solution of sodium chloride so that there were substantially no hydrogen ions present within the membrane during the monomer treatment step. After the monomers had sufficiently diffused into the membrane, the condensation reaction was then initiated by equilibrating the resin with the acid catalyst (1 N HCl) for 5 minutes. This method allowed deeper penetration of the monomers into the membrane body as evidenced by a better than two-fold increase in lateral resistance over the untreated sections.

EXAMPLE 4

An anion-exchange membrane comprising a quaternized copolymer of 2-vinyl pyridine and divinylbenzene and having its four manifold holes located on a single border was treated in the same general area as described in the previous cation membrane examples. This selected area was exposed to a 1 N NaOH solution for about 30 minutes to equilibrate the membrane into the hydroxyl form. After thoroughly rinsing in water, the treatment continued for 30 minutes in 50% resorcinol, about 30 minutes in 37% formaldehyde, 5 minutes in 1 normal sulfuric acid and finally a flushing with water. Measurements obtained showed a lateral resistance increase of five-fold over the untreated sections and a through resistance increase of a factor of about 12. The deflection measurement gave a reduction in bowing by a factor of 3.

EXAMPLE 5

A second anion membrane was treated in the same manner as above except that a 40% solution by weight of phenol was substituted for the resorcinol. The areas resulting from this treatment gave similar measurements to that obtained by the resorcinol treatment.

EXAMPLE 6

A monomeric treating solution was prepared by first dissolving 1 gram of a polymerization catalyst (ammonium persulfate) in 50 ccs. of water and adding the same to 200 ccs. of glacial acrylic acid. A sodium form cation-exchange membrane (12″ x 12″) of the type comprising a sulfonated copolymer of styrene and divinyl benzene was cut into two equal sections. One section was immersed in the solution and allowed to stand for 17 hours and the other section remained untreated. The treated section was removed from the monomer solution, placed between two glass plates and heated for two hours at 60–70° C. A test strip cut out from both the treated and untreated membranes was equilibrated in 0.01 N NaCl solution prior to taking comparative resistance measurements. The results showed the treated strip had increased better than three-fold in through resistance over the untreated strip. Lateral resistance showed a 50% increase.

EXAMPLE 7

The method of Example 6 was repeated using a solution comprising 100 ccs. of polyvinyl pyrrolidone, 100 ccs. of glacial acrylic acid, 100 ccs. of water and 1 gram of ammonium persulfate. Using this procedure the through resistance increased better than two-fold and the increase in lateral resistance was about 25%.

EXAMPLE 8

An electrodialysis stack was provided containing 100 cell pairs and comprising alternating anion-exhange membranes and cation-exchange membranes, each separated by a spacer member having the general design of that shown in FIGURE 2. The membranes employed were those of the prior art wherein their entire surfaces were completely untreated. With an electrolyte feed solution having a specific resistance of about 21 ohm-cm. in the inlet manifolds, severe lateral shorting (burning) was observed at 200 volts at 95° F. When the current to the stack was cut off and the hydraulic pressure in the concentrating cells was increased five pounds over that of the diluting cells a solution leak rate into the diluting cells was measured at about 0.5 cc. per minute per cell pair. The membranes were removed from the stack and replaced by membranes which had been treated by the process of this invention. The cation membranes were treated as described in Example 3 and the anion membranes were treated by the procedure outlined in Example 4. Both sides of each membrane were treated over a specified area (as illustrated in FIGURE 2) to impart greater electrical resistance and increased stiffness therein. When this stack was put into operation it was observed that a 15–20% higher voltage was required to produce lateral shorting. Testing the stack under a differential hydraulic pressure of 5 p.s.i.g. revealed a 25% decrease in cross-leakage over the previous stack.

From the foregoing description, drawings and illustrative examples, it will be seen that the present invention provides a simple and efficient means for reducing lateral shorting and membrane channel bowing. The very simplicity of the present invention affords the further advantages of doing away with the need for extra parts and does not interfere with the hydraulics of the system.

While for purposes of illustration, the novel membranes of this invention have been described in connection with electrodialysis and electrolytic systems utilizing alternating anion-exchange membranes and cation-exchange membranes, it will be appreciated that the membranes are equally useful in other types of systems. For example, systems are known which utilize only cation-exchange membranes, only anion-exchange membranes, or neutral (non-permselective) membranes alone or in combination with anion and/or cation exchange membranes. Such systems, as known in the art, are useful, for example, in double decomposition chemical reactions. The novel membranes are also useful in systems involving a plurality of anion- and cation-exchange membranes wherein the said membranes are not present in equal quantities, i.e., where there are more anion-exchange membranes than cation-exchange membranes, or vice versa. The membranes may also be utilized in fuel cells which employ ion-exchange membranes as barriers or as the electrolyte. It is therefore to be expressly understood that the membranes are useful in any systems wherein increased ohmic resistance and/or increased stiffness or hardness is a desired property.

The systems illustrated in the drawing serve only by way of illustration and not by way of limitation to describe the invention.

Accordingly, since certain changes may be made without departing from the scope of the invention herein involved, it is intended that all matter contained in the above description and shown in the accompanying drawings shall be interpreted as illustrative and not in a limiting sense.

What is claimed is:

1. An electrically conductive ion-exchange membrane for use in electrodialysis apparatus, said membrane having at least one adjacent contacting spacer member, said membrane and spacer having fluid inlet and outlet manifold holes, said spacer further having a fluid flow path area therein connected to said inlet and outlet manifold holes by fluid flow channels, at least one side of said membrane having selective portions containing a deposit therein of a solid, cross-linked, substantially non-ionic polymer filler thereby effecting decreased flexibility and increased electrical resistance in said selective portions as compared to the remaining unselective portion, said selective portions comprising the membrane area extending from the inside edge of at least one manifold hole outwardly at least in a direction toward the membrane's fluid flow path area for a distance sufficient to substantially reduce lateral flow of electric current.

2. The membrane as described in claim 1 wherein the area of said selective portions extends in a direction towards the membrane's flow path for a distance of about between ¼" to 2".

3. The membrane as described in claim 1 wherein the entire area commencing from the inside edge of the manifold hole and extending outwardly to the oppositely disposed edge of the membrane's liquid flow path comprises the selective portions.

4. The membrane of claim 1 wherein both sides contain substantially identical selective portions.

5. An ion-exchange membrane containing a plurality of manifold holes, the improvement comprising at least one side of said membrane having selective portions containing a deposit therein of a solid, cross-linked, substantially non-ionic polymer filler thereby effecting decreased flexibility and increased electrical resistance in said selective portions as compared to the remaining unselective portions, said selective portions comprising the membrane area covering the inside peripheral edge of at least one manifold hole and extending outwardly therefrom in all directions for a distance of about between ¼" to 2".

6. The method of increasing electrical resistance and decreasing flexibility of selective areas of an electrically conductive ion-exchange membrane for use in electrodialysis apparatus wherein at least one side of said membrane is in contact with one adjacent spacer member, both membrane and spacer having corresponding fluid inlet and outlet manifold holes, said spacer further having a fluid flow path area, the steps comprising contacting the membrane area covering the inside edge of at least one of said membrane manifold holes and extending outwardly therefrom at least in a direction toward the membrane's corresponding spacer flow path area with a liquid polymerizable monomeric or comonomeric material which is soluble in polar solvents for a period of time to allow said material to diffuse within said membrane area, and thereafter polymerizing said material in situ in the presence of a polymerization catalyst to form a solid, cross-linked, substantially non-ionic filler therein.

7. The method of claim 6 wherein the selected membrane area is impregnated with the comonomer prior to contact with the polymerization catalyst.

8. The method of claim 6 wherein the selected membrane area is contacted separately with each monomeric component of said comonomer.

9. The method of claim 6 wherein the monomeric material is selected from the class consisting of phenol-aldehyde, formaldehyde - carbamide, formaldehyde-triazine, formaldehyde-ketone, formaldehyde - amino, polyesters, polysulfide, polyamide, epoxy, vinyl and mixtures thereof.

10. The method of claim 6 where the comonomer is a phenol-aldehyde selected from the group consisting of phenol-formaldehyde, resorcinol-formaldehyde, hydroxybenzene-formaldehyde, cresylic acid-formaldehyde, cresol-formaldehyde, phenol-furfural and mixtures thereof.

11. The method of claim 6 wherein the selective areas are contacted with an aqueous solution of a mixture of resorcinol and formaldehyde monomers for a time sufficient to allow diffusion of said mixture within said area and contacting said monomerically impregnated areas with a water soluble polymerization catalyst to accelerate the polymerization of said monomers in situ thereby forming a solid, substantially non-ionic polymer filler therein.

12. The method of claim 11 wherein the two monomers are separately contacted with said areas and allowed to diffuse separately therein and wherein the catalyst is selected from the group consisting of acids and bases.

References Cited

UNITED STATES PATENTS

Re. 25,265 10/1962 Kollsman _____ 204—180
3,083,118 3/1963 Bridgeford _____ 260—2.1

FOREIGN PATENTS 794,343 4/1958 Great Britain.

OTHER REFERENCES

Wilson: "Demineralization by Electrodialysis," p. 150.

HOWARD S. WILLIAMS, *Primary Examiner.*

A. C. PRESCOTT, *Assistant Examiner.*